Jan. 20, 1925.
G. BAILLIO
TROLLEY
Filed Oct. 17, 1924
1,523,854
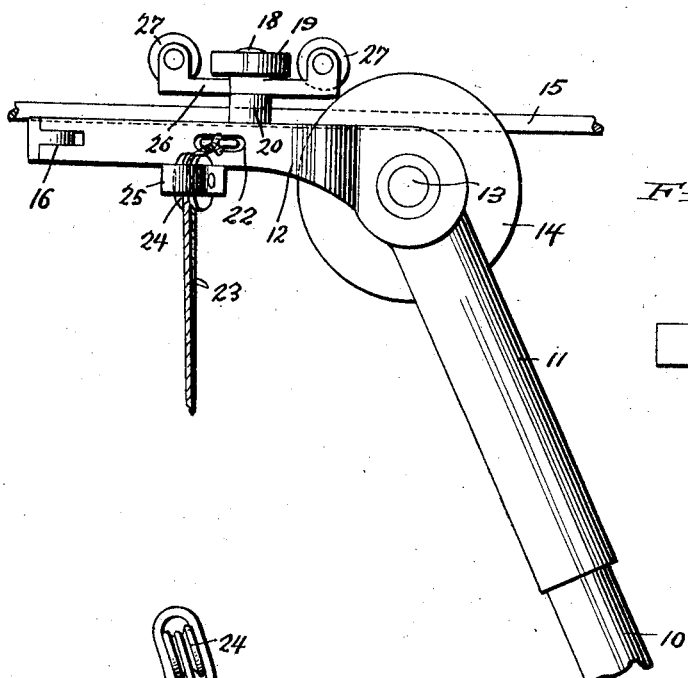
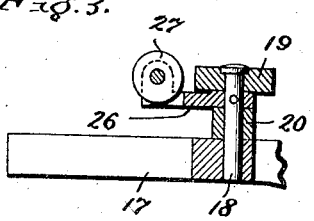
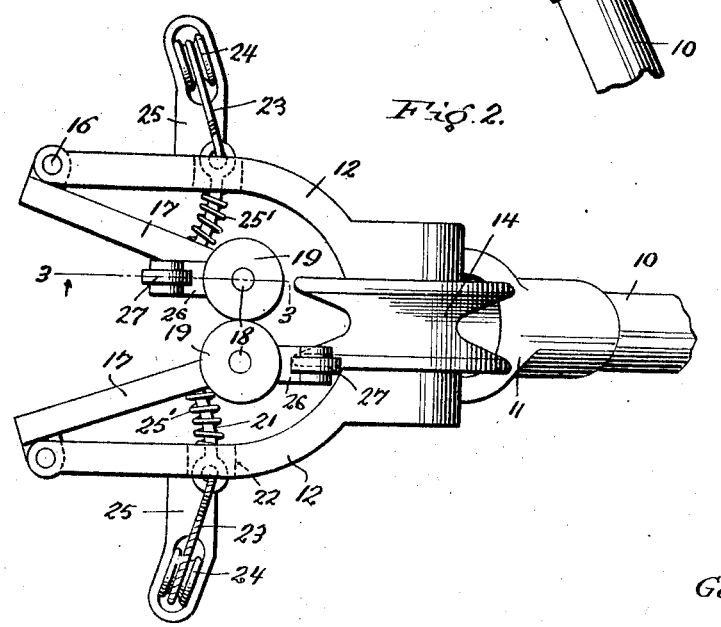
George Baillio
INVENTOR
BY Victor J. Evans
ATTORNEY
WITNESS: Gerald Hennesy Patented Jan. 20, 1925.

1,523,854

UNITED STATES PATENT OFFICE.

GEORGE BAILLIO, OF RICHMOND, VIRGINIA.

TROLLEY.

Application filed October 17, 1924. Serial No. 744,215.

*To all whom it may concern:*

Be it known that I, GEORGE BAILLIO, a citizen of the United States, residing at Richmond, in the county of Henrico and State of Virginia, have invented new and useful Improvements in Trolleys, of which the following is a specification.

This invention relates to improvements in trolleys and has for an object the provision of novel means for retaining the trolley wheel in engagement with the trolley wire, the said means including anti-friction means whereby the trolley will have free movement along the wire and wear upon the trolley and wire will be reduced to a minimum.

Another object of the invention is the provision of means mounted upon the trolley for contact with the wire switch plates, whereby the trolley will be prevented from leaving the wire when passing over switches, the plate engaging means acting to prevent contact of the wire engaging means with the plate.

With the above and other objects in view, the invention further includes the following novel features and details of construction, to be hereinafter more fully described, illustrated in the accompanying drawings and pointed out in the appended claims.

In the drawings:—

Figure 1 is a side elevation illustrating the invention.

Figure 2 is a top plan view of the same.

Figure 3 is a fragmentary section on the line 3—3 of Figure 2.

Referring in detail to the drawings wherein like characters of reference denote corresponding parts, the reference character 10 indicates a portion of a trolley pole at the upper end of which is secured a harp 11. This harp includes spaced horizontally disposed rigid arms 12, while mounted between these arms upon a shaft or axle 13 is a grooved contact wheel 14, the latter being adapted to receive the trolley wire 15.

Pivotally secured to the outer ends of the rigid arms 12 as indicated at 16 are arms 17. These arms extend inward and carry at their inner ends pins or studs 18 upon which are mounted horizontally disposed retaining wheels 19. Mounted upon the pins or studs 18 between the arms 17 and the wheels 19 are combined spacing and anti-friction rollers 20 which are adapted for engagement with the opposite sides of the trolley wire 15 so that the trolley may have free movement along the wire, while wear upon the trolley and the wire will be reduced to a minimum.

Extending from the pivoted arms 17 are guide arms 21. These arms extend through openings 22 provided in the rigid arms 12 and have secured to their outer ends cables 23. These cables pass over grooved pulleys 24 which are supported by brackets 25, the latter extending outwardly from the rigid arms 12. The cables 23 extend downward so that a pull upon these cables will move the arms relatively and separate the wheels 19. This movement is resisted by means of coiled springs 25' which surround the arms 21 and bear against the opposed faces of the arms 12 and 17. The wheels 19 will thus be positioned above the wire 15 and act to retain the trolley in place.

Carried by the studs 18 are horizontally disposed brackets 26. These brackets extend forwardly and rearwardly in opposite directions and have mounted in their outer ends wheels 27. These wheels extend vertically above the upper faces of the wheels 19 and are adapted to engage the under faces of trolley wire switch plates and act to guide the trolley and prevent engagement of the wheels 19 with the plates.

The invention is susceptible of various changes in its form, proportion and minor details of construction and the right is herein reserved to make such changes as properly fall within the scope of the appended claims.

Having described the invention what is claimed is:—

1. In a trolley, a harp including rearwardly disposed spaced rigid arms, a grooved contact wheel mounted between the inner ends of the arms for engagement with the trolley wire, inwardly extending arms pivotally secured to the rigid arms, horizontally disposed retaining wheels carried by the pivotally secured arms and spaced from the contact wheel, guide arms extending from the pivoted arms through the rigid arms, springs surrounding the guide arms between the pivoted and rigid arms to yieldingly force said rigid arms inward and hold the retaining wheels in contacting engagement and cables extending from the guide arms whereby the wheels may be moved relatively.

2. In a trolley, a harp including rearwardly disposed spaced rigid arms, a grooved contact wheel mounted between the inner ends of the arms for engagement with the trolley wire, inwardly extending arms pivotally secured to the rigid arms, horizontally disposed retaining wheels carried by the pivotally secured arms and spaced from the contact wheel, guide arms extending from the pivoted arms through the rigid arms, springs surrounding the guide arms between the pivoted and rigid arms to yieldingly force said rigid arms inward and hold the retaining wheels in contacting engagement, cables extending from the guide arms whereby the wheels may be moved relatively and forwardly and rearwardly disposed guide wheels arranged at right angles to and extending above the horizontally disposed wheels.

3. In a trolley, a harp including rearwardly disposed spaced rigid arms, a grooved contact wheel mounted between the inner ends of the arms for engagement with the trolley wire, inwardly extending arms having one of their ends pivotally secured to the rigid arms, horizontally disposed retaining wheels mounted upon the opposite ends of the pivoted arms, spring means for yieldingly forcing the retaining wheels in contacting relation, means whereby the retaining wheels may be separated, combined spacing and anti-friction rollers located between the retaining wheels and pivoted arms, oppositely disposed brackets supported by the pivoted arms and vertically disposed guide wheels carried by the brackets.

In testimony whereof I affix my signature.

GEORGE BAILLIO.